United States Patent
Aad

(10) Patent No.: US 10,268,775 B2
(45) Date of Patent: Apr. 23, 2019

(54) METHOD AND APPARATUS FOR ACCESSING AND DISPLAYING PRIVATE USER INFORMATION

(71) Applicant: NOKIA TECHNOLOGIES OY, Espoo (FI)

(72) Inventor: Imad Aad, Préverenges (CH)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 13/621,520

(22) Filed: Sep. 17, 2012

(65) Prior Publication Data

US 2014/0081980 A1    Mar. 20, 2014

(51) Int. Cl.
*G06F 17/30*    (2006.01)

(52) U.S. Cl.
CPC .............. *G06F 17/30946* (2013.01)

(58) Field of Classification Search
None
See application file for complete search history.

(56) References Cited

U.S. PATENT DOCUMENTS

| | | | | |
|---|---|---|---|---|
| 5,701,463 A * | 12/1997 | Malcolm | ............... | G06F 9/4425 707/758 |
| 7,797,251 B2 | 9/2010 | Smith | | |
| 7,984,169 B2 | 7/2011 | Brunell et al. | | |
| 8,510,846 B1 * | 8/2013 | Gunnarson et al. | ............. | 726/26 |
| 8,646,032 B2 | 2/2014 | Aad et al. | | |
| 2002/0033838 A1 * | 3/2002 | Krueger | ............. | G06F 9/44521 715/700 |
| 2004/0199782 A1 * | 10/2004 | Arnold | ............. | G06F 21/6245 726/27 |
| 2006/0074897 A1 * | 4/2006 | Fergusson | ............. | 707/4 |
| 2007/0130070 A1 * | 6/2007 | Williams | ............. | 705/50 |
| 2007/0143704 A1 | 6/2007 | Laird-McConnell | | |
| 2010/0114834 A1 * | 5/2010 | Aujames | ............. | G06F 21/6245 707/652 |
| 2010/0131758 A1 * | 5/2010 | Ben-Natan | ............. | H04L 63/0428 713/166 |
| 2010/0332578 A1 * | 12/2010 | Gopal et al. | ............. | 708/650 |
| 2012/0059680 A1 * | 3/2012 | Guthrie et al. | ............. | 705/7.11 |
| 2012/0109983 A1 * | 5/2012 | Vanderhallen et al. | ............. | 707/752 |

(Continued)

FOREIGN PATENT DOCUMENTS

| | | | | |
|---|---|---|---|---|
| WO | WO 0034856 | * | 6/2000 | ............. G06F 9/00 |
| WO | WO 01/61438 A2 | | 8/2001 | |
| WO | WO 2011/070393 A1 | | 6/2011 | |

OTHER PUBLICATIONS

Privacy-Preserving Data Mining, Agrawal et al, ACM SIGMOD, pp. 439-450, 2000.*

(Continued)

*Primary Examiner* — Augustine K. Obisesan
(74) *Attorney, Agent, or Firm* — Alston & Bird LLP

(57) ABSTRACT

For accessing and displaying private user information, a privacy-preserving overlay platform determines a request, from at least one application, for user data. The privacy-preserving overlay platform processes and/or facilitates a processing of the data to generate at least one index value of the data. Further, the privacy-preserving overlay platform causes, at least in part, a return of the at least one index value to the at least one application in response to the request.

19 Claims, 14 Drawing Sheets

(56) References Cited

U.S. PATENT DOCUMENTS

| | | | | |
|---|---|---|---|---|
| 2012/0233129 | A1* | 9/2012 | Brinkmoeller | G06F 21/6254 707/662 |
| 2012/0259877 | A1* | 10/2012 | Raghunathan | G06F 21/6254 707/757 |
| 2012/0278621 | A1* | 11/2012 | Woloszyn | H04L 61/2596 713/168 |

OTHER PUBLICATIONS

Privacy Preserving Keyword Searches on Remote Encrypted Data, Chang et al, ACNS, LNCS 3531, pp. 442-455, 2005.*

Crytographic Cloud Storage, Kamara et al., Financial Crytography and Data Security, LNCS 6054, pp. 136-149, 2010.*

Practical Techniques for Searches on Encrypted Data, Song et al, Proceedings of IEEE Symposium on Security Security and Privacy, pp. 44-55, 2000.*

"Hashing for Privacy in Social Apps", http://mattgemmell.com/2012/02/11/hashing-for-privacy-in-social-apps/.

"Security and Privacy", http://support.google.com/a/bin/answer.py?hl=en&answer=60762.

D. Lin et al., "Preventing Information Leakage From Indexing in the Cloud", http://www.computer.org/portal/web/csdl/doi/10.1109/CLOUD.2010.82.

Your Address Book is Mine: Many iPhone apps take your data / Venture Beat / Mobile / by JVG [online] [retrieved Sep. 19, 2016]. Retrieved from the Internet: <URL: http://http://venturebeat.com/2012/02/14/iphone-address-book/>. (dated Feb. 14, 2012), 9 pages.

Practical Private Set Intersection Protocols with Linear Computational Bandwidth Complexity [online] [retrieved Sep. 19, 2016]. Retrieved from the Internet: <URL: http://http://eprint.iacr.org/2009/491.pdf. 17 pages.

The Cryptography API, or How to Keep a Secret [online] [retrieved Sep. 19, 2016]. Retrieved from the Internet: <URL: https://msdn.microsoft.com/en-us/library/ms867086(d=printer).aspx>. (dated Aug. 19, 1996) 15 pages.

Hardware Security Module [online] [retreived Sep. 19, 2016]. Retrieved from the Internet: <URL: https://en.wikipedia.org/wiki/Hardware_security_module>. 5 pages.

* cited by examiner

| CONTACTID | APPLICATION1 | APPLICATION2 | ... | APPLICATION_N |
|---|---|---|---|---|
| 1 | ID_1,1 | ID_1,2 | ... | ID_1,N |
| 2 | ID_2,1 | ID_2,2 | ... | ID_2,N |
| 3 | ID_3,1 | ID_3,1 | ... | ID_3,N |
| ... | | | ... | |
| K | ID_K,1 | ID_K,2 | ... | ID_K,N |

METHOD AND APPARATUS FOR ACCESSING AND DISPLAYING PRIVATE USER INFORMATION

BACKGROUND

Service providers and device manufacturers (e.g., wireless, cellular, etc.) are continually challenged to deliver value and convenience to consumers by, for example, providing compelling network services capable of personalization. Such personalization may be dependent on applications being granted some level of access to user data. One area of interest has been the development of services and technologies for privacy overlays, wherein an application may access a rich personal data store via an obfuscation protection technique functioning as a conduit to application function while preserving user data privacy. However, the existing methods for preserving user privacy are prone to security breaches, limited functionality, and burdensome verification processes that may not be clearly understood by a user. Accordingly, service providers and device manufacturers are challenged to develop new mechanisms for effectively and efficiently preserving user privacy without sacrificing application functioning and personalization that many users have become dependent on.

SOME EXAMPLE EMBODIMENTS

Therefore, there is a need for an approach for accessing and displaying private user information.

According to one embodiment, a method comprises determining a request, from at least one application, for user data. The method also comprises processing and/or facilitating a processing of the data to generate at least one index value of the data. The method further comprises causing, at least in part, a return of the at least one index value to the at least one application in response to the request.

According to another embodiment, an apparatus comprises at least one processor, and at least one memory including computer program code for one or more computer programs, the at least one memory and the computer program code configured to, with the at least one processor, cause, at least in part, the apparatus to determine a request, from at least one application, for user data. The apparatus is also caused to process and/or facilitate a processing of the data to generate at least one index value of the data. Further, the apparatus causes, at least in part, a return of the at least one index value to the at least one application in response to the request According to another embodiment, a computer-readable storage medium carries one or more sequences of one or more instructions which, when executed by one or more processors, cause, at least in part, an apparatus to determine a request, from at least one application, for user data. The apparatus is also caused to process and/or facilitate a processing of the data to generate at least one index value of the data. Further, the apparatus causes, at least in part, a return of the at least one index value to the at least one application in response to the request.

According to another embodiment, an apparatus comprises means for determining a request, from at least one application, for user data. The apparatus also comprises means for processing and/or facilitating a processing of the data to generate at least one index value of the data. The apparatus further comprises means for causing, at least in part, a return of the at least one index value to the at least one application in response to the request.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 4A-4D are diagrams of platform schematics utilized in the processes of FIGS. 3A-3I, according to various embodiments;

DESCRIPTION OF SOME EMBODIMENTS

Examples of a method, apparatus, and computer program for accessing and displaying private user information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
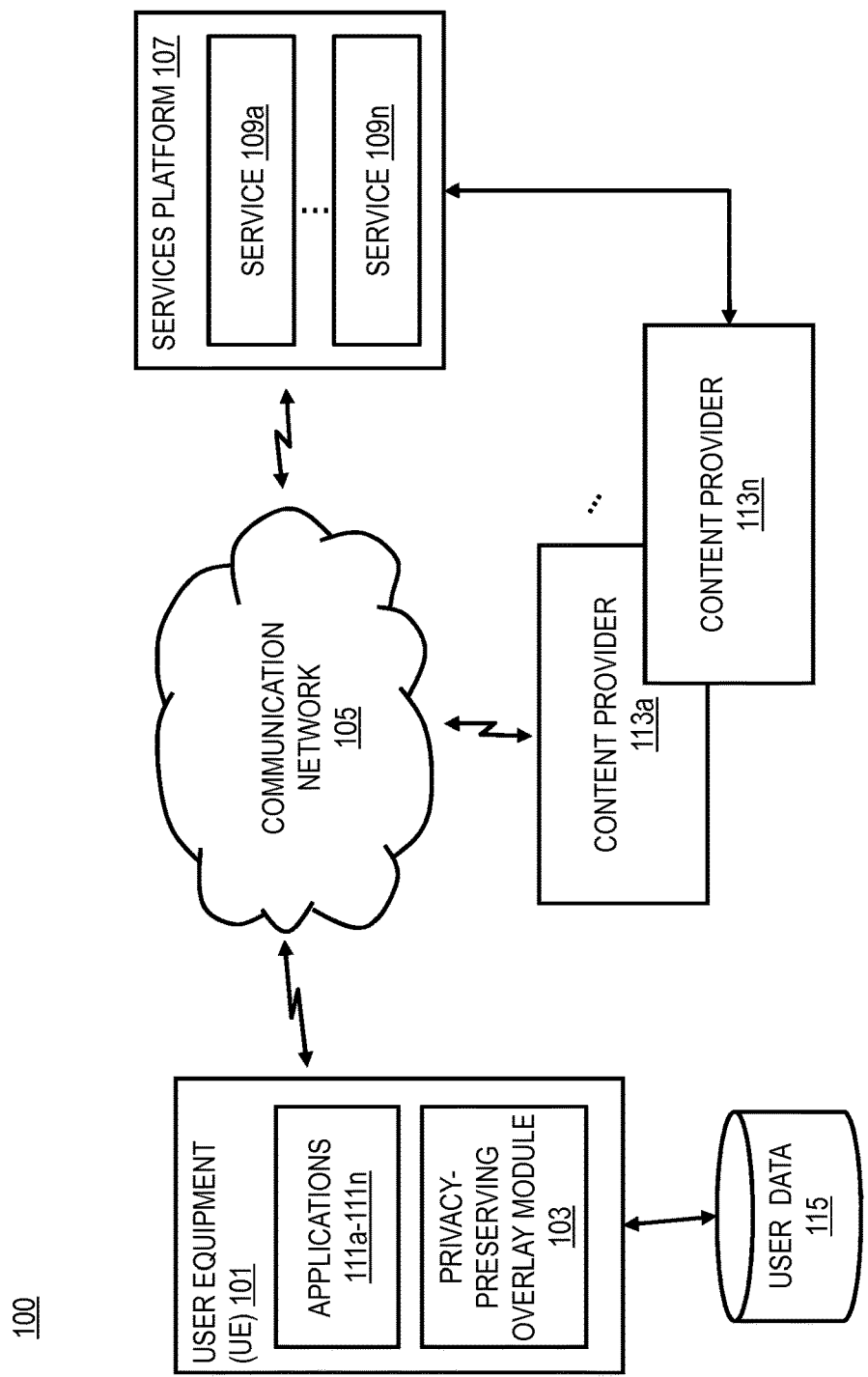
FIG. 1 is a diagram of a system capable of accessing and displaying private user information, according to one embodiment.

FIG. 1 is a diagram of a system capable of accessing and displaying private user information, according to one embodiment. As discussed above, users have adopted highly capable and complex mobile communication devices due in part to the many functions available to enhance the daily life activities of a user. Much of this functionality is implemented via both native and third party applications running on such devices. As such, these mobile companions are a rich personal data store including but not limited to, contacts, schedules/calendars, pictures, video, location, location tags, etc. Application usage, implemented over a rich personal data store, creates a serious risk to user security; applications may access user data and transmit it elsewhere to be shared and/or mined without user consent or even user awareness. Such security risks may limit user adoption of current and future applications and application functions to the detriment of users and user communities.

To address this problem, a system 100 of FIG. 1 introduces the capability to allow applications to access user personal data while preserving privacy. Such obfuscation techniques employ various anonymization approaches while preserving the ability of applications to manipulate user data. However, applications only gain access to anonymized user data indexes derived from raw personal data—not the actual data contents. Limiting access to indexes effectively breaks the linkage of information accessed by different applications belonging to and/or developed by the same entity to provide a further layer of user privacy preservation.

As shown in FIG. 1, the system 100 comprises a user equipment (UE) 101 having connectivity to a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, a privacy-preserving overlay module 103 provides user data to an application. In such an example, without privacy preservation technique, an exemplary application programming interface may appear as:

request→contacts(*)//returns a list with all contact names and details request→contacts( )//returns a contact name specified by the user request→photo( )//returns a picture specified by the user In such an example, access to the list of contacts (request→contacts(*)) potentially enables the application to infer user profile information via data mining techniques. For instance if most of the names in the list are indicative of a given religion, it is likely that the user follows this religion. Such information, even seemingly innocuous information, would likely be private and worthy of privacy-preserving measures. In a further example, in such a scenario where the most frequently contacted person (chosen by request→contacts( ) is listed as contact Alice (for example), then an application may be able to determine that the contact Alice may be of particular importance, such as the user's spouse. In a similar exemplary embodiment, if an application asks a user to tag a person in a picture (accessed using request→photo( ) using the user's contacts list (request→contacts( ), the application can then determine contact identity and the associated image derived from a user's picture(s).

If such information is limited to a user's device, it may not raise any privacy concerns for the user. However, there is no practical way to detect if such information is encrypted and sent over the network to remote servers for possible data manipulation and/or mining. Therefore, it is highly desirable to enable applications to perform their functions without access to the raw user data.

In one embodiment, application obfuscation is achieved via a privacy-preserving application programming interface that ensures application access grants to user data is limited while allowing full application functionality. Such an example may appear as:
PPrequest→contacts(*)//returns a list of identifiers of the contacts
PPrequest→contacts( )//returns an identifier of a contact specified by the user
PPrequest→photo( )//returns an identifier of a picture specified by the user The UE 101 may execute one or more applications 111a-111n (collectively referred to as applications 111). The applications 111 may be any type of application, such as one or more social networking applications, one or more navigational applications, one or more organizational applications, one or more browsing applications (e.g., Internet browser), one or more sensor applications, etc., or a combination thereof. Further, a UE 101 may include the privacy-preserving overlay module 103 for providing user data privacy and/or security when the applications 111 request for data associated with a user and/or a user device.

The system 100 may also include a services platform 107 that includes one or more services 109a-109n (collectively referred to as services 109). The services 109 may be any type of service, such as one or more social networking services, one or more navigational services, one or more organizational services, one or more sensor services, etc., or a combination thereof. In one embodiment, one or more services 109 may perform one or more functions of the privacy-preserving overlay module 103. In one embodiment, the privacy-preserving overlay module 103 may provide processed information (e.g., substantially without revealing raw data) pertaining to personal detail information and/or reference contextual information via user data 115 to one or more of the services 109 so that the services 109 may provide personalized services to the user. In various embodiments, one or more functions of the privacy-preserving overlay module 103 may be performed by the one or more services 109, for example, by implementing the one or more functions such that user data is processed according to the privacy-preserving overlay module 103 methods before the user data is shared with any applications, service providers, content providers, and/or any other entity of the system 100.

The system 100 may also include one or more content providers 113a-113n (collectively referred to as content providers 113). The content providers 113 may provide any type of content, such as content related to social networking services, one or more navigational services, one or more organizational services, one or more sensor services, etc., or a combination thereof. In one embodiment, the privacy-preserving overlay module 103 may provide information pertaining to personal detail information and/or reference contextual information via user data 115 to one or more of the content providers 113 so that the content providers 113 may provide personalized services to the user.

The system 100 may also include user data 115 functioning, in part, as user data storage. The user data 101 may include contacts, user events, user content items, and location-based context data (e.g., time stamps, etc.). For example, the context data contains environment data, weather data, traffic data, event data, commuter data, etc. Services platform 107 may collect, assemble, store, update, and/or supply the context data and user context data. In one embodiment, user context data, such as, but not limited to user events may be extracted from calendars, emails, voice messages, text messages, blogs, bulletin boards, discussion forums, geographic information systems, and social network websites. In another embodiment, user content items may be used to infer context data and may be retrieved from, for instance, personal photo albums, media libraries, playlists, etc. In one embodiment, a privacy-preserving overlay module 103 processes the context data and user context data of different formats and types including data derived from various forms of communication such as emails, text messages, voice messages, calls, video/audio clips, etc.

By way of example, the UE 101, privacy-preserving overlay module 103, services platform 107, user data 115, and content providers 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
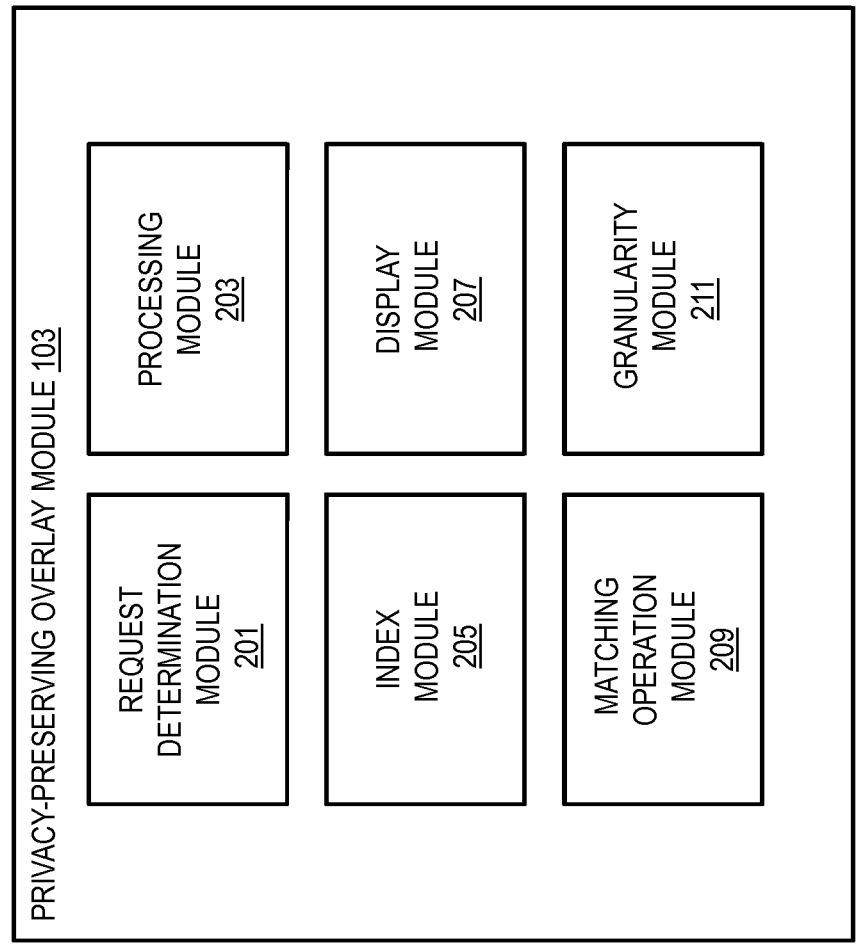
FIG. 2 is a diagram of the components of privacy-preserving overlay platform, according to one embodiment.

FIG. 2 is a diagram of the components of privacy-preserving overlay module 103, according to one embodiment. By way of example, the privacy-preserving overlay module 103 includes one or more components for accessing and displaying private user information. It is contemplated that the functions of these components may be combined in one or more components or performed by other components of equivalent functionality. In this embodiment, the privacy-preserving overlay module 103 includes a request determination module 201, processing module 203, index module 205, display module 207, matching operation module 209, and granularity module 211.

The request determination module 201, functions in part to determine application requests for user data by coordinating with privacy-preserving overlay module 103. In some embodiments, request determination module 201 may determine another application request to perform an operation associated with the user data. In one embodiment, request determination module 201 functions coordinately with index module 205 to specify an index value. Request determination module 201 functions coordinately with privacy-preserving overlay module 103 to determine one or more display parameters according to an action via display module 207.

The processing module 203, functions coordinately with at least the privacy-preserving overlay module 103 to process and/or facilitate a processing of data to generate at least one index value representative of and/or embodying data, such as, but not limited to user data. In some embodiments, such processing employs encryption methodologies, anonymization approaches, or a combination thereof. In one embodiment, processing via processing module 203 functions according to encryption parameters, hash functions, cryptographic functions, or a combination thereof to determine an index value. Such parameters and functions may be employed via a level of granularity to maximize user function and/or privacy preservation thresholds at no cost to application function.

The index module 205 functions coordinately with the privacy-preserving overlay module 103 to generate at least one data index value via processing module 203 to return the index value to an application in response to a request. In some embodiments, one or more applications manipulate an index value. In some embodiments, for user privacy preservation, index module 205 generates index values on a per application basis, at least in part, by a randomization operation, an index calculation operation specific to the at least one application, or a combination thereof. In some embodiments, an index value may impart an initiation of at least one operation on the user data on behalf of an application. In some embodiments, such an operation may include a matching operation.

The display module 207 functions coordinately with the privacy-preserving overlay module 103 via one or more operations. In some embodiments, an operation may include, at least in part, a display operation according to display parameters. Such a display operation may derive from any available user information including, but not limited to, a multimedia application/function (e.g., images, videos, etc.) according to one or more index values.

The matching operation module 209 functions coordinately with the privacy-preserving overlay module 103 via an operation. In some embodiments an operation may include, at least in part, a matching operation. In some embodiments, matching operation module 209 may cause, at least in part, an initiation of a matching operation on at least one index value, one or more other index values, user data, other user data, or a combination thereof to determine one or more matched data items.

The granularity module 211 determines at least one index value based, at least in part, on a level of granularity. In one embodiment, a level of granularity may be defined according to the nature of the data to be indexed according to user and/or system needs. In some embodiments, data fields are subdivided according one or more anonymization approaches.

Figure 6:
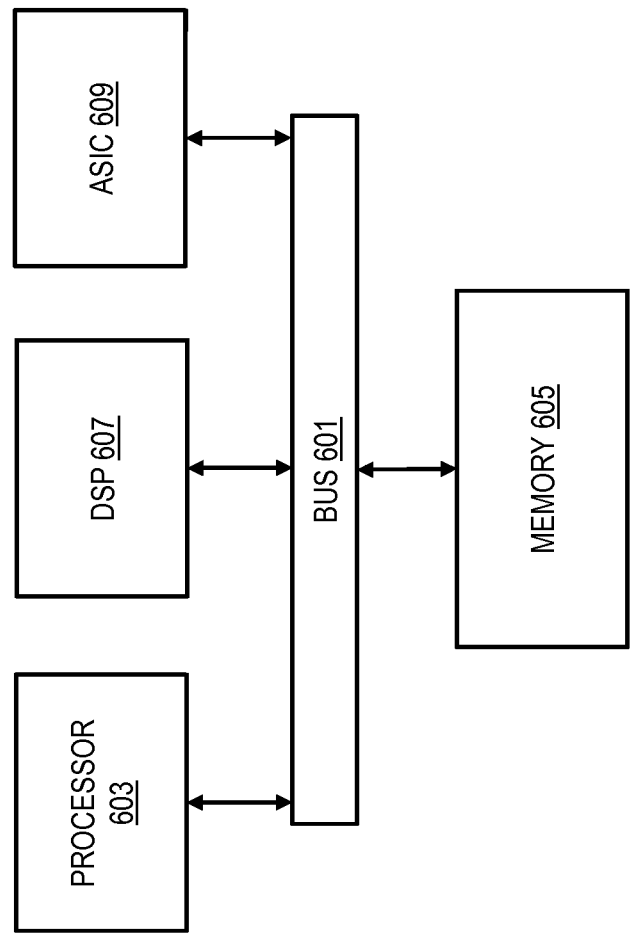
FIG. 6 is a diagram of a chip set that can be used to implement an embodiment of the invention.

FIGS. 3A-3I are flowcharts of processes for accessing and displaying private user information, according to various embodiments. In one embodiment, the privacy-preserving overlay module 103 performs the process 300 and is implemented in, for instance, a chip set including a processor and a memory as shown in FIG. 6.

Figure 3B:
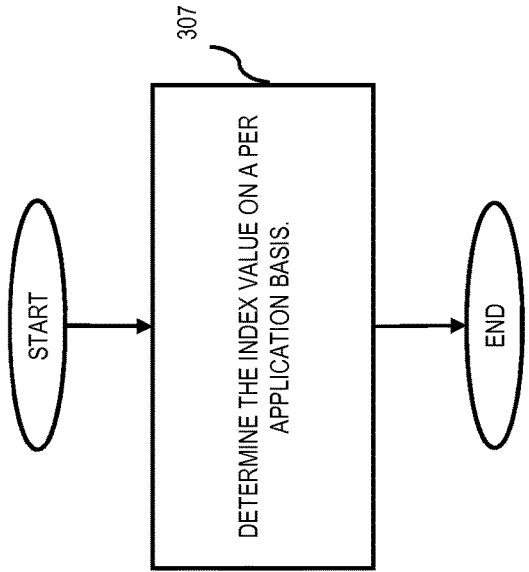
FIGS. 3A-3I are flowcharts of processes for accessing and displaying private user information, according to various embodiments.
Figure 3A:
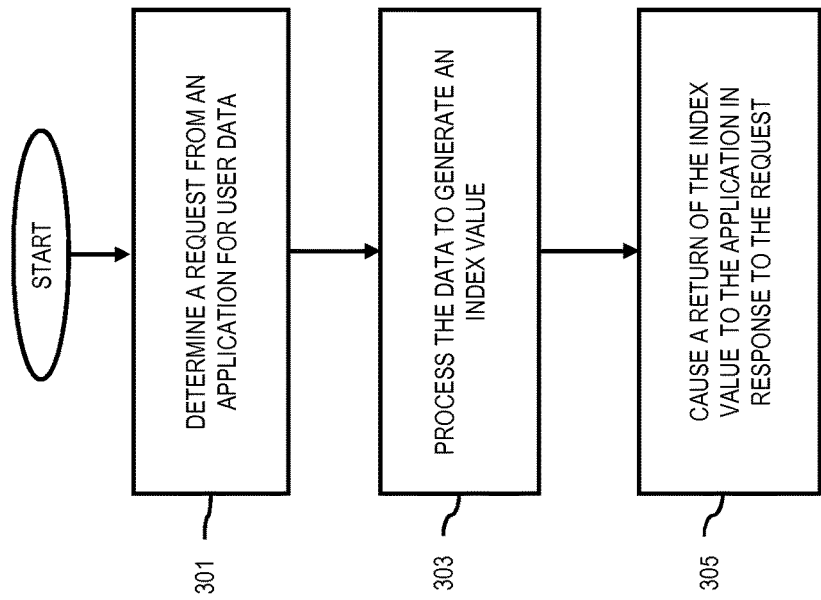

Referring to FIG. 3A, in step 301, request determination module 201 determines a request, from at least one application, for user data. Such a request may derive from any application, such as, but not limited to an application native to the device, a third party application, a service provider application, or a combination thereof. In some embodiments, user data may include any data of a personal and/or private nature used in any process of an application action, operation, or a combination thereof. In step 303, index module 205 processes and/or facilitates a processing of the data to generate at least one index value of the data. In some embodiments, such index values represent any data derivative of, and indicative of, user data. Such data may embody an anonymized representational form of the raw data, such as, but not limited to, labels, identifiers, or a combination thereof. Such index data may be returned to one or more applications without exposing the underlying data representative of a user's rich personal data store. In one embodiment, the index module 205 may determine if the data has already been processed and whether it is associated with existing index values prior to further processing. In step 305, privacy-preserving overlay module 103 causes, at least in part, a return of the at least one index value to the at least one application in response to a request. In one embodiment, the privacy-preserving overlay module 103 functions between an application requesting user data and personal data store so the at least one application manipulates the at least one index value in place of the user data.

Referring to FIG. 3B, in step 307, index module 205 determines the at least one index value on a per application basis. In some embodiments, such a per application basis may include, at least in part, a randomization operation, an index calculation operation specific to the at least one application, or a combination thereof. In some embodiments, such a per application basis effectively breaks the linkage of information accessed by different applications belonging to and/or developed by the same entity to provide a further layer of user privacy preservation.

Figure 3D:
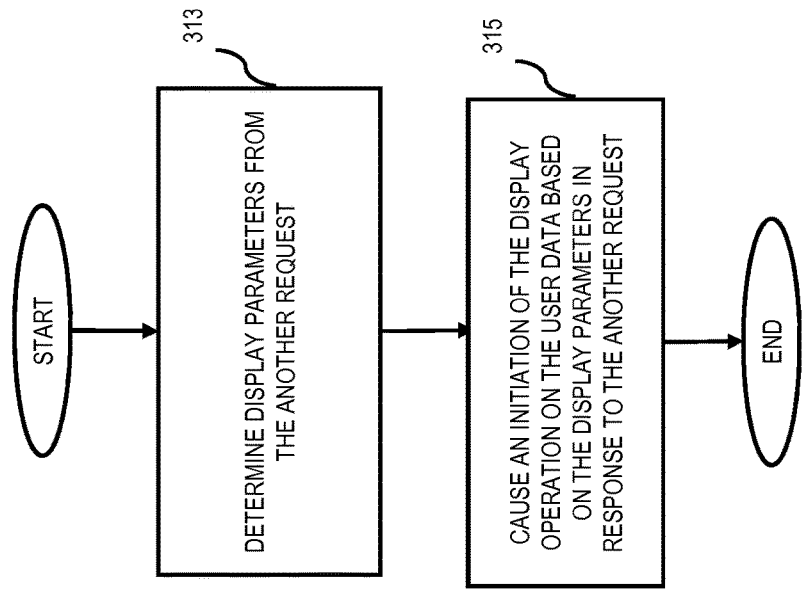
Figure 3C:
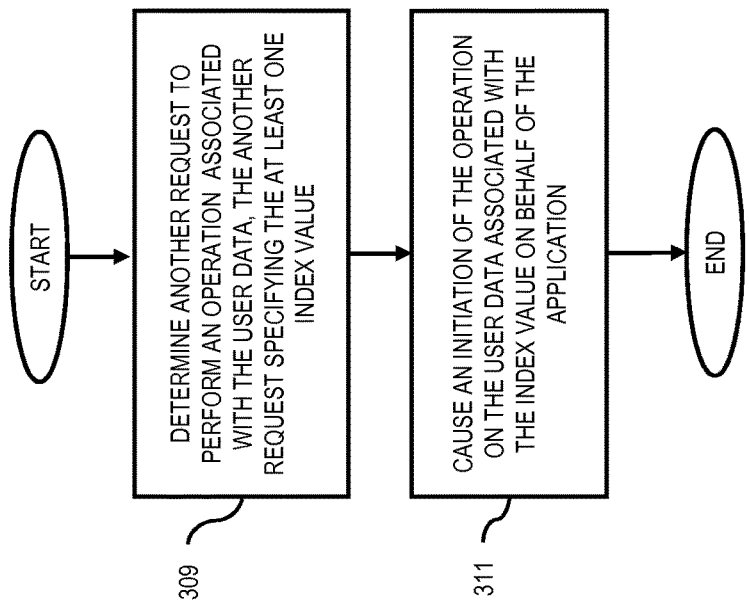

Referring to FIG. 3C, in step 309, request determination module 201 coordinates with privacy-preserving overlay module 103 to determine another request, from the at least one application, to perform at least one operation associated with the user data, the another request specifying the at least one index value. In one embodiment, any operation wherein raw personal data may be exposed by the action of one or more applications may trigger privacy-preserving overlay module 103 action, including, but not limited to, limiting access to only user index values. In step 311, privacy-preserving overlay module 103 functions coordinately to cause, at least in part, an initiation of the at least one operation on the user data associated with the at least one index value on behalf of the at least one application. In some embodiments, such applications function cooperatively with privacy-preserving overlay module 103. In some embodiments, such applications do not function cooperatively with privacy-preserving overlay module 103; however, applications are still only granted access to user information via indexes derived from privacy-preserving overlay module 103.

Referring to FIG. 3D, in step 313, request determination module 201 functions coordinately with privacy-preserving overlay module 103 to determine one or more display parameters according to an action via display module 207 from the another request. In step 315, display module 207 causes, at least in part, an initiation of the display operation on the user data based on the display parameters in response to the another request. Such display parameters may be application derived, user derived, system derived, or a combination thereof.

Figure 3F:
Figure 3F:
Figure 3E:
Figure 3E:
Figure 3H:
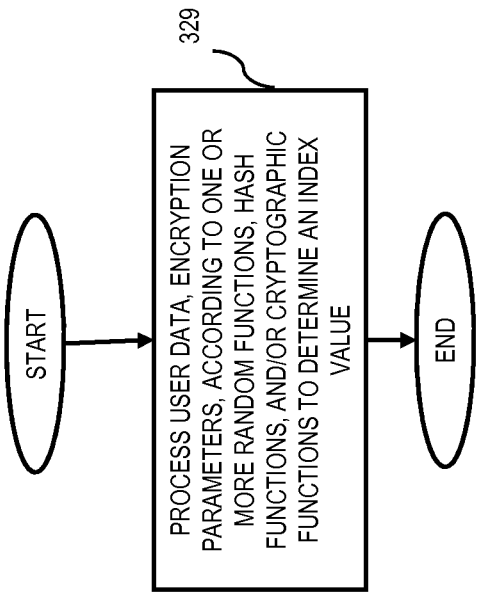
Figure 3G:
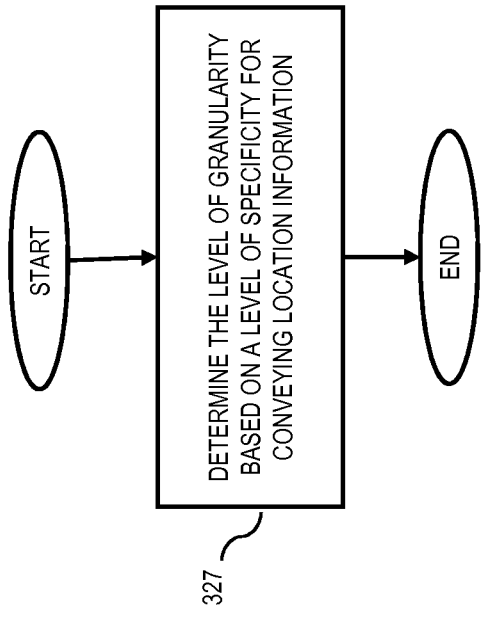

Referring to FIG. 3E, in step 317, index module 205 determines one or more other index values for other user data associated with one or more other users. In step 319, matching operation module 209 causes, at least in part, an initiation of the matching operation on the at least one index value, the one or more other index values, the user data, the other user data, or a combination thereof to determine one or more matched data items. Such matching operation module 209 actions may be utilized to connect and/or locate associated users according to application, user, and/or systems parameters without exposing underlying rich data stores to enhance application functionality. In step 321, index module 205 causes, at least in part, a return of the at least one index value associated with the one or more matched data items in response to the another request.

Referring to FIG. 3F, in step 323, granularity module 211 functions coordinately with privacy-preserving overlay module 103 to determine a level of granularity of the user data for the at least one application. In some embodiments, the level of granularity may be user defined, application defined, system defined, or a combination thereof. In one embodiment, a level of granularity may be defined according to the nature of the data to be indexed according to user needs. In some embodiments, data fields are subdivided according one or more anonymization approaches. In step 325, index module 205 functions coordinately with granularity module 211 to determine the at least one index value based, at least in part, on the level of granularity. In step 327 of FIG. 3G, granularity module 211 determines the level of granularity based, at least in part, in part, a level of specificity for conveying the location information Referring to FIG. 3H, in step 329, processing and/or facilitating a processing to user data, one or more encryption parameters, or a combination according to one or more random functions, one or more hash functions, one or more cryptographic functions, or a combination thereof to determine the at least one index value.

Figure 3I:
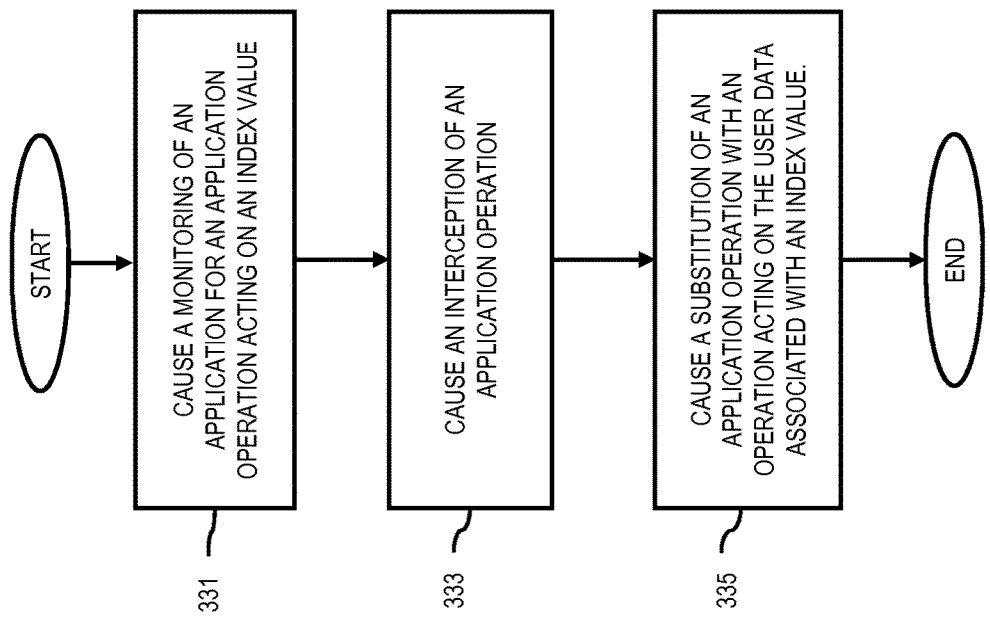
Figure 4A:
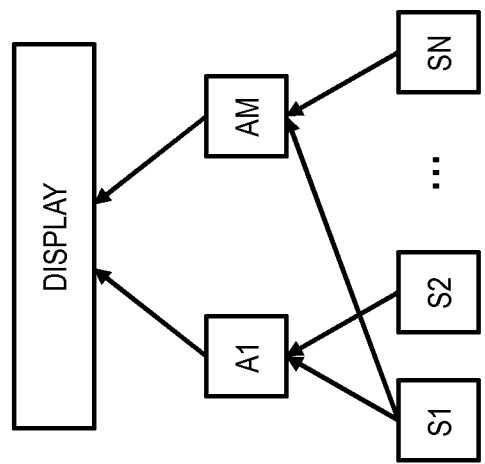

Referring to FIG. 3I, in step 331, privacy-preserving overlay module 103 causes, at least in part, a monitoring of the at least one application for at least one application operation acting on the at least one index value. In step 333, request determination module 201 functions coordinately with privacy-preserving overlay module 103 to cause, at least in part, an interception of the at least one application operation. In some embodiments, such an interception of an application operation may be triggered by the privacy-preserving overlay module 103 and may function cooperatively or independently of the application. In step 335, privacy-preserving overlay module 103 causes, at least in part, a substitution of the at least one application operation with an operation acting on the user data associated with the at least one index value FIGS. 4A-4D are diagrams of platform schematics utilized in the processes of FIGS. 3A-3I, according to various embodiments. FIG. 4A is a schematic depicting Applications (A_i) access to the data sources (S_j) to obtain requested information, and display the result without any "privacy interfaces". Applications using such a "legacy" application programming interface, as illustrated in FIG. 1, request the user data in order to display it to a user in some (application-specific) way. In some embodiments, display employs a list of previously contacted people via an application, displaying a small picture next to a contact name. To preserve such displaying functionality in a privacy-preserving way, the new application programming interface should support displaying functions such as:

PPshow→contact(d, coordinates, format)//displays the name of the contact identified by id, at specific coordinates of the screen, using a specific format PPshow→photo(id, coordinates, format)//displays the photo identified by id, at specific coordinates of the screen, using a specific format Content identifiers (picture ID, or contact ID) must reveal no information about the contents such as the alphabetical order in the list, or the chronological order. One way to remove such information leakage from IDs is to apply non-reversible hash functions to the (content+password), such as:

id=hash(contact_name||password)

where hash can be sha256sum, || is string concatenation, and password is a system password, inaccessible to an application, such as, but not limited to a $3^{rd}$ party applications.

In some embodiments, to add an additional layer of privacy-preservation, the linkage of information passed to different applications is broken, so that applications from the same entity, or developed by the same company/parties may be prohibited from inferring particular user connections. If for instance application1 accesses the user's contacts list, and application2 manages a user's pictures, passing consistent contact identifiers to both reveals sensitive private information typically useless for the functioning of the applications but worthy of privacy preservation if passed to other parties and/or servers. In an exemplary data mining inference approach, if most of the people in the pictures are tagged with the same person's id, then it is likely that this id corresponds to a family member (or a very close person of particular interest/import). Such data mining approaches can be avoided by introducing application-specific entries to the hash function:

id=hash(contact_name||password||application_name)

so that identifiers remain consistent for a given application, but totally unrelated between different applications. Further cryptographic primitives can be applied to strengthen the non-reversibility such as:

id=hash(pass1||contact_name||application_name||pass2)

FIG. 4B is a schematic depicting identifiers with their corresponding applications, that are stored in a lookup-table/database (as illustrated in FIG. 4B) accessible only to the trusted overlay in order to facilitate reverse-lookups. Instead of using hashes as specified above, id_i,j can be also computed as random numbers, from a wide range to avoid collisions. In such an example, the application employs hashed identifiers of the elements in the contacts list. When such an application displays a list of previous calls it may display the pictures and next to such a list the names of the persons the user called last. In such an example, the non-privacy-preserving solution is that the application reads the picture files, then reads the contacts names, and displays all information accordingly. The privacy-preserving option utilizing a privacy-preserving overlay asks the application programming interface: "display the picture of contact number 722 at coordinates x,y of the screen, size W×L", and "display the name of contact number 722 at coordinates x+d,y, font size 12". As such, the user's privacy is preserved, in that the application cannot determine a contact's name, and has no real access to the image contents (only index values), at no, or limited, cost to application functionality.

In some embodiments, a Gallery application (e.g., for displaying photos) may employ face recognition capability and may ask the user to point out which contact-person is displayed. It would be beneficial for user functionality for the application to display "Alice" (contact name identifier) next to the image of the person's face, but the user prefers that this application is not granted access to such personal information. In one example, the application knows that the person in the picture is contact number 523. For displaying the name next to the face, the application uses such an approach to ask the application programming interface: "display the name of contact 523 at coordinates x,y of the screen, font 12". Such an approach offers full functionality at limited cost to privacy.

Figure 4C:
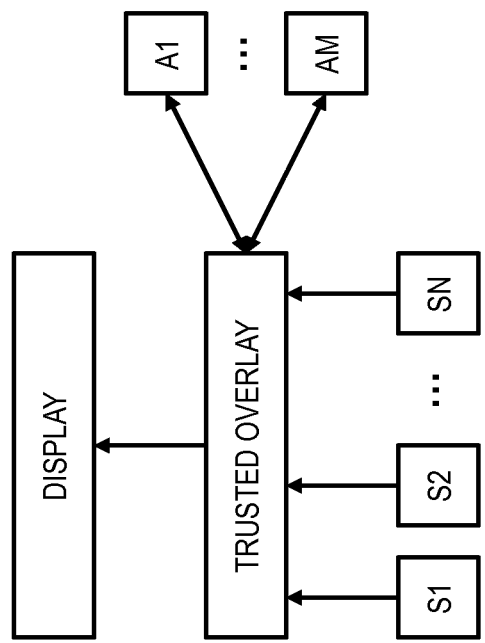

FIG. 4C is a schematic depicting a trusted overlay interfacing between sources of personal information and untrusted applications. From a conceptual point of view, such a privacy-preserving application programming interface can be considered and implemented as a secure/trusted "privacy-preserving" overlay that displays user data (from sources 51, ..., Sn) upon requests from applications (A1, ..., Am), without access or sharing actual data. For instance, an application, using such an application programming interface, would (request to) show friends' names, next to their pictures, without actually accessing neither the names nor the picture contents. All privacy-sensitive data (e.g. contacts, photos) are displayed using the secure/trusted "privacy-preserving" overlay, keeping the privacy records of "well-behaved" (e.g., trusted) applications at high levels, while enabling the full application functionalities, without granting unlimited access rights to user data.

Although embodiments discussed above have defined approaches to managing access to contacts and display approaches this methodology can be applied to any kind of user data exposed to any application—third party applications, system applications, service provider application, native device applications, or a combination thereof. As such, various privacy-preserving application programming interfaces can be conceived in a similar manner. For instance, consider an application that applies auto-completion while typing contact names. The legacy solution would require the application to read the whole contacts list (such as request→contacts(*)), and perform auto-completion while the user inputs the name (to the application directly). This reveals the whole contacts list to the application, and the associated information detailing user communication with such contacts. Whereas the privacy-preserving alternative would consist of the application asking the trusted privacy-preserving overlay to intercept the user input, perform and display the auto-completion based on the actual list of contacts without passing neither the user-input nor the auto-completions to the application, but only offering the resulting hashed contact identifier to such an application.

Figure 4D:
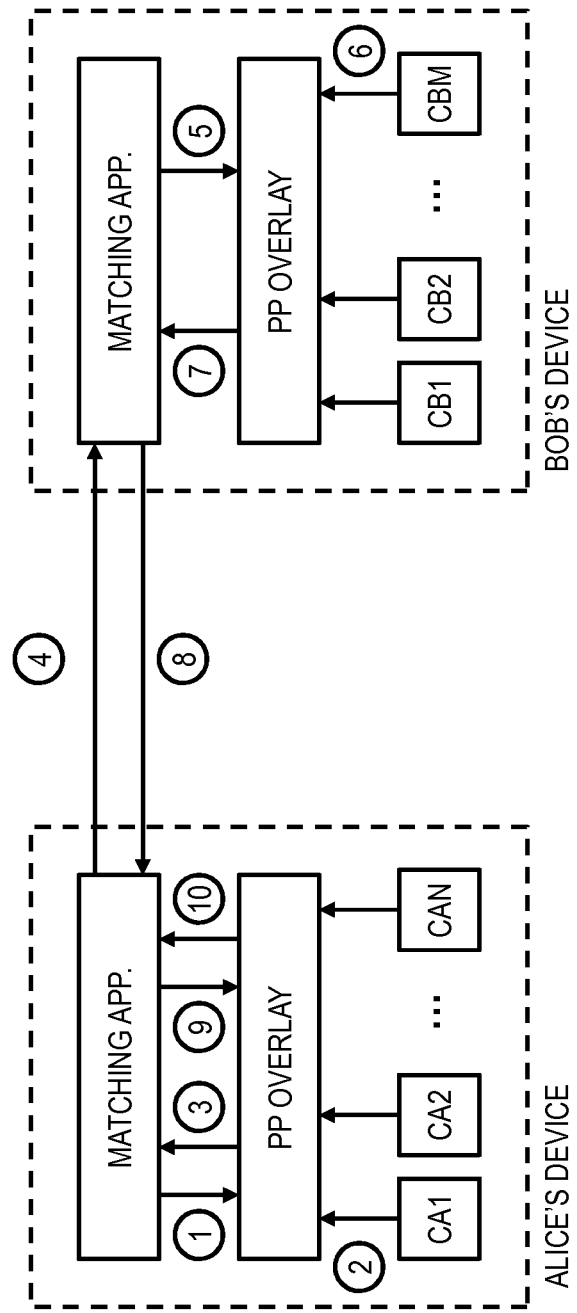

FIG. 4D is a schematic depicting Private Set Intersection performed at the overlay level. It is contemplated that such a privacy-preserving application programming interface would complicate "matching" techniques like friend-finding, where the actual names are typically used for matching. Cryptographic solutions based on Private Set Intersection (PSI) typically solve the matching problem in a privacy-preserving way. Such approaches may be adapted to the trusted overlay as follows: Alice has contacts Ca1, ..., Can. Bob has contacts Cb1, ..., Cbm. Both installed an application for common friend-finding. The application typically accesses the clear lists of contacts on both sides for match finding. The privacy-preserving version adapts PSI and layers the trusted overlay in between the application and the data to be matched.

In one embodiment a "Match-making" application on a user device asks the privacy-preserving overlay to provide it with contacts "indexes". This action can be user-triggered or not. The overlay reads the contacts ($Ca\_i$) and computes $x\_i = H1(Ca\_i)\^r\_i$, where H1 is a public non-reversible hash function, and $r\_i$ is a random number known to a user's overlay only. In some embodiments, the overlay passes all $x\_i$'s to the match-making application. The match-making application on the user device sends the $x\_i$'s to its counterpart on another user's device. The match-making application on the other device passes the $x\_i$'s to the overlay, which computes $y\_i = x\_i\^ a$, where a is a random number known to the other device's overlay only. In the example embodiment, an overlay further reads contacts $Cb\_i$ and computes $z\_i = H2(H1(Cb\_i)\^ a)$, where H2 is another public non-reversible hash function. Further, another device's overlay sends the $y\_i$ and $z\_i$'s to the match-making application. As such, $y\_i$ and $z\_i$ are sent to the match-making application on a device, and $y\_i$ and $z\_i$ are passed to the overlay which computes $H2(y\_i\^1/r\_i)$. Further, the overlay compares the $z\_i$'s to the $H2(y\_i\^/r\_i)$, and informs the overlay of the corresponding matches. In such embodiments, friend-finding is therefore performed by 3rd party applications without any access to the actual contacts list, with the support of the trusted overlay application programming interface. In some embodiments, a like technique can be used for privacy preserving searches of other private information.

In some embodiments, applications require location information from a mobile device, where the returned (GPS) values include excess information uncritical for the application purpose. Such a privacy-preserving overlay may apply to an application that changes the profile (ringtone/vibrate, wallpaper, locking etc.) based on whether the user is at home, or at work. Providing the application precise GPS coordinates excess information whereas "home" and "work" would be sufficient for proper application functioning. Instead of giving the applications GPS coordinates, the proposed trusted overlay offers the application a privacy-preserving location application programming interface that returns specific location tags (e.g. "home", "work", "gym", "bar" etc.). As such, location tagging can be either automatically done by the trusted overlay, or manually input by the user, as opposed to being left to the applications to infer from the precise GPS coordinates and the timestamps.

The processes described herein for accessing and displaying private user information may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 5:
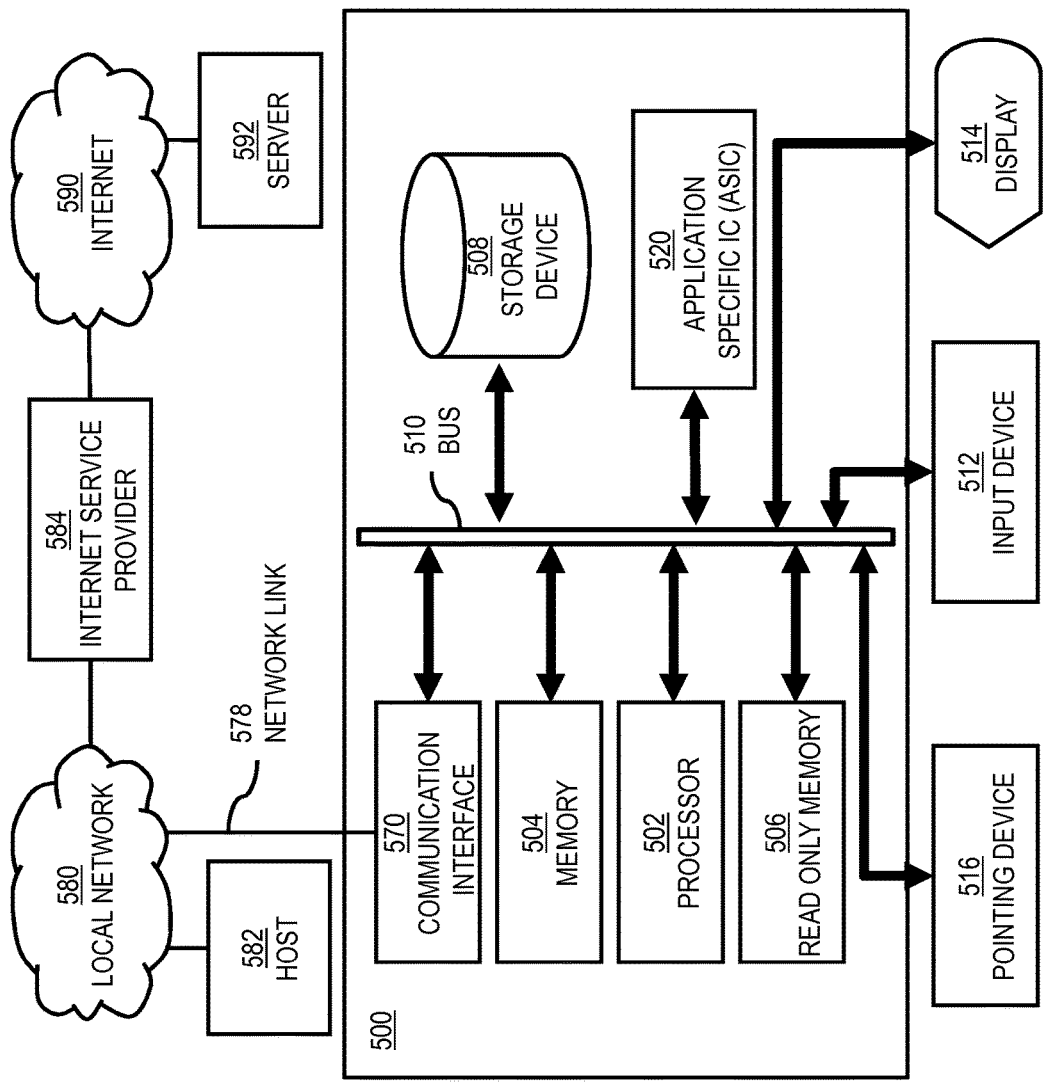
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to access and display private user information as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of accessing and displaying private user information.

A bus 510 includes one or more parallel conductors of information so that information is transferred quickly among devices coupled to the bus 510. One or more processors 502 for processing information are coupled with the bus 510.

A processor (or multiple processors) 502 performs a set of operations on information as specified by computer program code related to accessing and displaying private user information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or any other dynamic storage device, stores information including processor instructions for accessing and displaying private user information. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or any other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for accessing and displaying private user information, is provided to the bus 510 for use by the processor from an external input device 512, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT), a liquid crystal display (LCD), a light emitting diode (LED) display, an organic LED (OLED) display, a plasma screen, or a printer for presenting text or images, and a pointing device 516, such as a mouse, a trackball, cursor direction keys, or a motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for accessing and displaying private user information to the UE 101.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or any other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set or chip 600 upon which an embodiment of the invention may be implemented. Chip set 600 is programmed to access and display private user information as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of accessing and displaying private user information.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to access and display private user information. The memory 605 also stores the data associated with or generated by the execution of the inventive steps.

Figure 7:
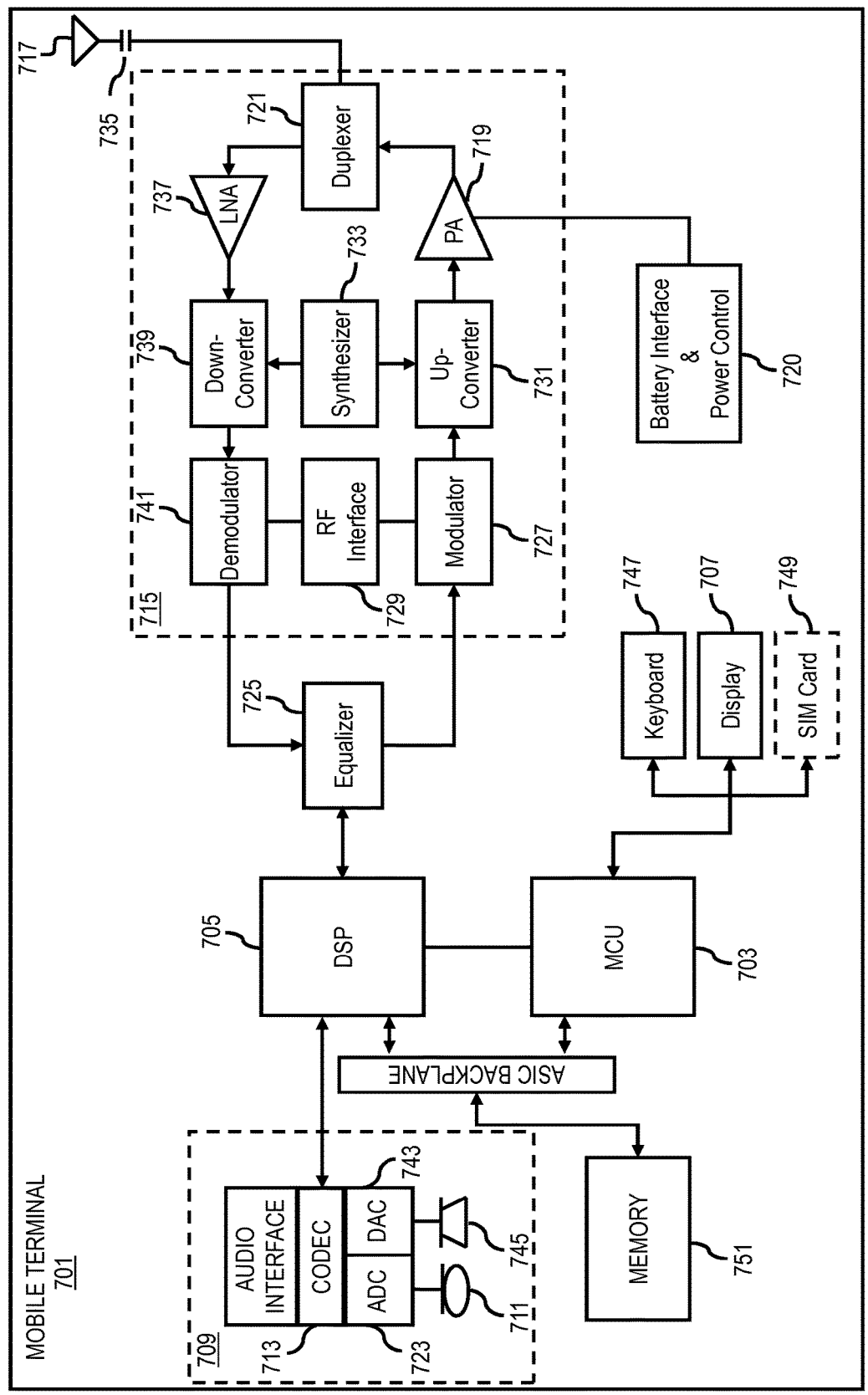
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 701, or a portion thereof, constitutes a means for performing one or more steps of accessing and displaying private user information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of accessing and displaying private user information. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to access and display private user information. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
receiving an indication of a request, from at least one application, for user data from a second application;
processing the user data to generate at least one index value of the data based on an index calculation operation specific to the at least one application;
returning the at least one index value to the at least one application in response to the request,
wherein the at least one index value represents any data derivative of, and indicative of the user data to preserve privacy of the user data, and
wherein the at least one application manipulates the at least one index value in place of the user data,
monitoring the at least one application for at least one application operation acting on the at least one index value;
intercepting the at least one application operation; and
substituting the at least one application operation with a different operation acting on the user data from the second application and associated with the at least one index value, wherein the substitution results in display of the user data concurrently with a display generated by the first application without exposing the user data to the first application, wherein full functionality of the first application is maintained.

2. The method of claim 1, further comprising:
determining the at least one index value on a per application basis.

3. The method of claim 2, wherein the determining of the at least one index value on a per application basis includes, at least in part, a randomization operation.

4. The method of claim 1, further comprising:
receiving an indication of another request, from the at least one application, to perform at least one operation associated with the user data, the another request specifying the at least one index value; and
initiating the at least one operation on the user data associated with the at least one index value on behalf of the at least one application.

5. The method of claim 4, further comprising:
determining one or more display parameters from the another request; and
initiating the display operation on the user data based, at least in part, on the display parameters in response to the another request.

6. A method of claim 4, wherein the at least one operation includes, at least in part, a matching operation, further comprising:
initiating the matching operation on the at least one index value, a one or more other index values for other user data associated with one or more other users, the user data, the other user data, or a combination thereof to determine one or more matched data items; and
returning the at least one index value associated with the one or more matched data items in response to the another request.

7. The method of claim 1, further comprising:
determining a level of granularity of the user data for the at least one application; and
determining the at least one index value based, at least in part, on the level of granularity.

8. The method of claim 7, wherein the user data includes, at least in part, location information
and a level of granularity is determined based, at least in part, a level of specificity for conveying the location information.

9. The method of claim 1, further comprising:
processing the user data, one or more encryption parameters, or a combination according to one or more random functions, one or more hash functions, one or more cryptographic functions, or a combination thereof to determine the at least one index value.

10. The method of claim 1, wherein the at least one index value is generated based on a user input and wherein the at least one index value indicates the user data from the second application.

11. An apparatus comprising:
at least one processor; and
at least one memory including computer program code for one or more programs,
the at least one memory and the computer program code configured to, with the at least one processor, cause the apparatus to perform at least the following:
determine a request, from at least one application, for user data from a second application;
process the user data to generate at least one index value of the data based on an index calculation operation specific to the at least one application;
cause, at least in part, a return of the at least one index value to the at least one application in response to the request,
wherein the at least one index value represents any data derivative of, and indicative of the user data to preserve privacy of the user data, and
wherein the at least one application manipulates the at least one index value in place of the user data;
monitor the at least one application for at least one application operation acting on the at least one index value;
intercept the at least one application operation; and
substitute the at least one application operation with a different operation acting on the user data from the second application and associated with the at least one index value, wherein the substitution results in display of the user data concurrently with a display generated by the first application without exposing the user data to the first application, wherein full functionality of the first application is maintained.

12. The apparatus of claim 11, wherein the apparatus is further caused to:
determine the at least one index value on a per application basis.

13. The apparatus of claim 12, wherein the determining of the at least one index value on a per application basis includes, at least in part, a randomization operation.

14. The apparatus of claim 11, wherein the apparatus is further caused to:
determine another request, from the at least one application, to perform at least one operation associated with the user data, the another request specifying the at least one index value; and
cause, at least in part, an initiation of the at least one operation on the user data associated with the at least one index value on behalf of the at least one application.

15. The apparatus of claim 14, wherein the at least one operation includes, at least in part, a display operation, and wherein the apparatus is further caused to:
determine one or more display parameters from the another request; and
cause, at least in part, an initiation of the display operation on the user data based, at least in part, on the display parameters in response to the another request.

16. The apparatus of claim 14, wherein the at least one operation includes, at least in part, a matching operation, and wherein the apparatus is further caused to:
determine one or more other index values for other user data associated with one or more other users;
cause, at least in part, an initiation of the matching operation on the at least one index value, the one or more other index values, the user data, the other user data, or a combination thereof to determine one or more matched data items; and
cause, at least in part, a return of the at least one index value associated with the one or more matched data items in response to the another request.

17. The apparatus of claim 11, wherein the apparatus is further caused to:
determine a level of granularity of the user data for the at least one application; and
determine the at least one index value based, at least in part, on the level of granularity.

18. The apparatus of claim 17, wherein the user data includes, at least in part, location information, and wherein the apparatus is further caused to:
determine the level of granularity based, at least in part, in part, a level of specificity for conveying the location information.

19. The apparatus of claim 11, wherein the apparatus is further caused to:
process and facilitate a processing to user data, one or more encryption parameters, or a combination according to one or more random functions, one or more hash functions, one or more cryptographic functions, or a combination thereof to determine the at least one index value.

* * * * *